United States Patent Office 3,178,032
Patented Apr. 13, 1965

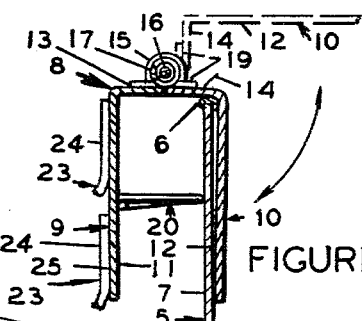
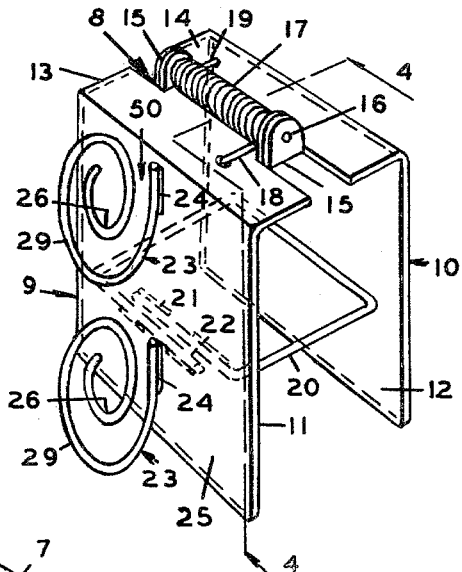
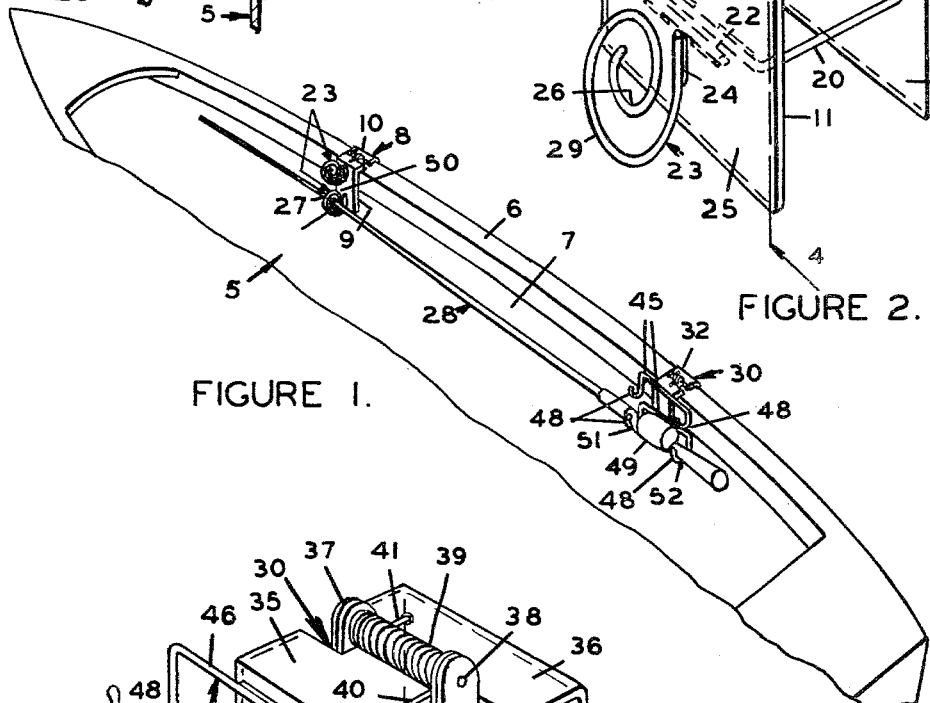
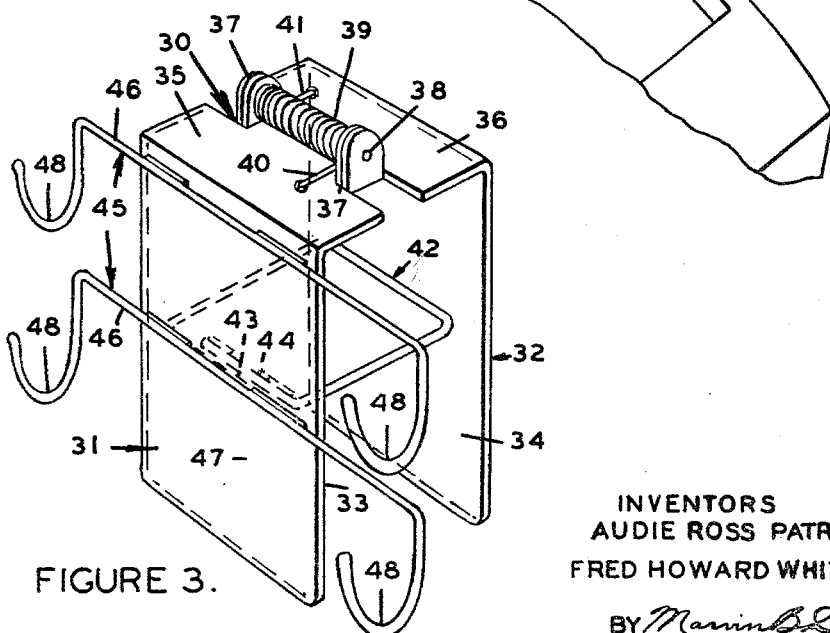

3,178,032
FISHING ROD SUPPORTS
Audie Ross Patrick, 4619 W. 61st Terrace, Shawnee Mission, Kans., and Fred Howard Whiteley, 1711 39th Ave., Kansas City, Kans.
Filed Aug. 5, 1963, Ser. No. 299,705
6 Claims. (Cl. 211—60)

This invention relates to an improvement in supports, which is a device designed primarily for holding a fishing rod below the level of a gunwale of a boat, and spaced along an inward face of the side wall of the boat, sheltered from relatively moving objects and positioned in readiness for a fisherman to quickly grasp the fishing rod and cast the rod while one or more fish or a school of fish are within the sight of the fisherman.

Heretofore, some fishermen placed their fishing rods on the floor of a boat while travelling from one location to another. The fishermen often stepped on the fishing rods when on the floor of a boat and some fishing rods were damaged or broken. Fishing rods supported on brackets above the level of the gunwale of a boat expose the fishing rods to possible breakage from relatively moving objects.

Broadly the fishing rod supports have a pair of clamps; manually opened and spread downwardly over a gunwale and side of a boat and clamped thereto; a flat member having one edge thereof secured to an outward face of one of said pair of clamps; the flat member being positioned in a normal upright plane and adapted to project inwardly relative to the side wall of a boat; the flat member having a slot therethrough and opening from one edge thereof; the flat member having the mentioned slot continued therethrough in a spiral like shape toward the central portion of the flat member; and adapted to receive an intermediate portion of the forward portion of a fishing rod to guide it through the slot to the central portion of the flat member by the movement of a fisherman's hand; a hook being secured to one outward face of the second clamp of said pair of clamps adapted to be projected inwardly relative to the side of a boat to support the opposite end portion of the fishing rod with the fishing reel thereon.

The flat member as described in the above paragraph may be a spiral-like flat member shaped from a rod. A slot is formed between the spiral turns of the rod and is the full equivalent of the mentioned flat member.

Another object of this invention is to provide two hooks spaced on a clamp for anchoring the fishing rod and reel against longitudinal movement thereof relative to the clamp.

Another object of this invention is to provide each support with a pair of normally upright plates spaced with opposed faces; hinge members secured to the upper ends of the normally upright plates to relatively pivot them together; a spring mounted on the hinge members to normally force the upright plates with opposed faces toward each other; one mentioned upright plate having a sufficient depth to bear against the outward portion of a gunwale of a boat and against a lower portion of the outward side of a boat spaced below the mentioned gunwale; a stiff member secured to the opposed face of the opposite plate of the normally upright plates and projected to contact an intermediate depth of the mentioned opposed face of the first mentioned normally upright plate; the pair of normally upright plates adapted to be manually spread over a gunwale of a boat; released with the stiff member bearing on the inward side wall of the boat; to clamp and stabilize the opposed face of the outward upright plate against movement on the outward face of the gunwale and mentioned portion of the side wall of the boat by relatively moving objects; and at least a hook on the mentioned opposite plate on the opposite face thereof from the face having the stiff member secured thereto adapted to support a portion of a fishing rod.

This specification will be more fully understood with reference to the accompanying drawing, and the claims appended.

FIGURE 1 is a view illustrating a portion of a boat in perspective with a pair of the improved supports clamped to a gunwale and side wall of the boat. A fishing rod is shown supported below the upper level of the gunwale with the improved supports.

FIGURE 2 is a view illustrating one of the improved supports in perspective with the flat members comprising spiral rods secured thereto in normal upright planes. A slot is shown between the spiral rod turns for the reception of a portion of a fishing rod.

FIGURE 3 is a view illustrating one of the improved supports with spaced hooks secured thereto for supporting and anchoring a fishing reel on a fishing rod against horizontal movement as illustrated in FIGURE 1.

FIGURE 4 is a view of a sectional elevation of a portion of the support taken on lines 4—4 of FIGURE 2 and turned for a straight sectional view in elevation. A section of the gunwale and side of the boat is also shown. One clamp plate of the support is also illustrated in dash lines when manually raised for the removal from, or the application to, a boat.

A typical boat 5, shown in FIGURE 1, is usually provided with a gunwale 6 on a wall 7 of a boat 5.

The improved support 8, shown in FIGURE 2, has a pair of normally upright members of plates 9 and 10 spaced with opposed faces 11 and 12 respectively. The upper extended hinge portions 13 and 14, of upright members or plates 9 and 10 respectively, are preferably bent flatwise in a normal horizontal direction and form hinge 15 on pivot 16.

A spring member 17 is loosely coiled on pivot 16 with the straight end portions thereof 18 and 19 pressing downwardly on the extended hinge portions 13 and 14 respectively to normally face the upright members or plates 9 and 10 toward each other.

A stiff member 20 is preferably formed of a rod to simulate a rectangular shape with the opposite end portions 21 and 22 thereof being secured to face 11 of plate 9.

The stiff member 20 is projected in a normal horizontal direction from face 11 toward face 12. The stiff member 20 is spaced from pivot 16 and the extended hinge portions 13 and 14 sufficiently below the gunwale 6 to clamp against the inward face of side wall 7 of boat 5.

Broadly each rod 23 has one end portion 24 secured uprightly to the face 25 of the upright plate 9. The opposite end portion of rod 23 is shaped to a hook portion 26 and adapted to support a portion 27 of a fishing rod 28.

More specifically each flat member formed of rod 23 is formed with an intermediate spiral portion 29 located between the end portion 24 and the hook portion 26. The hook portion 26 is located in the central portion of the spiral shape portion 29.

One rod 23 is spaced above the other rod 23 and the hook portions 26 with spiral portions 29 are projected outwardly in upright planes from face 9.

Support 30 shown in FIGURE 3 has a pair of normally upright members or plates 31 and 32 spaced with opposed faces 33 and 34 respectively. The upper extended hinge portions 35 and 36 of upright plates 31 and 32 respectively are bent flatwise in a normal horizontal direction and are formed at 37 to hinge on pivot 38.

A spring member 39 is preferably coiled on pivot 38 with the end portions thereof 40 and 41 pressing downwardly on the extended hinge portions 35 and 36 respectively to normally force the upright plates 31 and 32 toward each other.

A stiff member 42 is preferably formed from a rod to simulate a rectangular shape with the end portions 43 and 44 thereof being secured to face 33 of plate 31.

The stiff member 42 is projected in a normal horizontal direction from face 33 toward opposed face 34. The stiff member 42 is spaced from pivot 38 and the extended hinge portions 35 and 36 sufficiently below the gunwale member 6 of boat 5 to clamp against the inward face of side wall 7 of boat 5.

Broadly each rod 45 has a preferably horizontal portion 46 secured to the outer face 47 of upright plate 31. The opposite end portions of each rod 45 are shaped to hooks 48 spaced horizontally in upright planes to anchor a fishing line reel 49 against a normal horizontal movement. The fishing line reel 49 is on the fishing rod 28.

It is obvious that supports 8 and 30 have similar structure with the exceptions of the rod and hook supports for one or more fishing rods 28.

It is obvious that one or more fishing rods can be supported on the hooks by first manually moving a fishing rod portion 27 into the spiral slotted opening 50 and continuing the movement of the fishing rod 27 on the hook portion 26. Then guide the fishing line reel 49 between a pair of hooks 48 with the fishing rod portions 51 and 52 resting on the hooks 48.

It is also obvious that the fishing rods are positioned in readiness for quick casting; are generally sheltered from damage from ordinary movements of persons and objects within the boat; and fully protected from relatively moving objects above or outside of the boat.

We claim:

1. A fishing rod device which is designed primarily for holding a fishing rod below the level of a gunwale of a boat, and spaced along an inward face of the side of the boat, sheltered from relatively moving objects and positioned in readiness for a fisherman to quickly grasp the fishing rod and cast the rod while one or more fish or a school of fish are within sight of the fisherman; the fishing rod device comprising:
   (a) a pair of clamps,
   (b) said pair of clamps having sufficient depth adapted to be mounted over a gunwale of a boat in spaced relation,
   (c) said pair of clamps adapted to be extended downwardly over portions of the inward and outward faces of the side of a boat and clamped thereto,
   (d) a flat member,
   (e) said flat member having one edge thereof secured to an outward face of one of said pair of clamps in a normal upright position and adapted to be projected inwardly relative to the mentioned side of a boat,
   (f) said flat member having a slot therethrough and opening from one edge thereof,
   (g) said flat member having the mentioned slot continued therethrough toward the central portion of said flat member in a spiral shape and adapted to receive an intermediate portion of the forward portion of a fishing rod and guide it to the central portion of said flat member by the movement of a fisherman's hand,
   (h) a hook,
   (i) said hook being secured to the outward face of the second clamp of said second pair of clamps and adapted to support a rear portion of the mentioned fishing rod inwardly relative to a boat.

2. A fishing rod device as claimed in claim 1,
   (j) a second hook,
   (k) said second hook being secured to the mentioned outward face of the second mentioned pair of clamps,
   (l) said hooks being spaced sufficiently to receive a fishing line reel therebetween and adapted to support the immediate portions of the fishing rod on each end of the mentioned fishing line reel to anchor the fishing rod against longitudinal movement relative to the mentioned boat.

3. A support for supporting a portion of a fishing rod on the inward side of a boat below the level of a gunwale thereof, the support comprising:
   (a) a pair of normally upright members spaced with opposed faces,
   (b) said normally upright members having upper portions thereof bent and flexibly hinged together,
   (c) a spring member,
   (d) said spring member being mounted on the mentioned flexibly hinged portion to normally force said pair of normally upright members toward each other,
   (e) a stiff member,
   (f) said stiff member being secured to an intermediate depth portion of one of the mentioned opposed faces of said pair of normally upright members,
   (g) said stiff member being normally projected against the mentioned opposed face of the opposite normally upright member,
   (h) said stiff member being sufficiently spaced from the mentioned flexibly hinged portion adapted to be spaced below a gunwale on the inward side of a boat when said support is manually placed over the mentioned gunwale and released to be clamped to the side wall of the boat below the gunwale.
   (i) a rod,
   (j) said rod having the normal upper end portion thereof secured to the outer face of the mentioned normally upright member which has the anchor member secured to the inner face thereof,
   (k) said rod having a hook formed on the opposite end portion thereof and adapted to support a portion of a fishing rod.

4. A support as claimed in claim 3,
   (a) said rod having a sufficient intermediate length thereof curved to a spiral shape in a normal upright plane with the mentioned hook portion thereof terminating in the central portion of the spiral shape.

5. A support as claimed in claim 3,
   (a) said rod having a pair of hooks thereon spaced normally horizontal in upright planes and adapted to support a portion of a fishing rod thereon with a fishing line reel anchored horizontally therebetween.

6. Supports for supporting portions of a fishing rod spaced from the inward side of a boat below the level of a gunwale thereof, each support comprising:
   (a) a pair of normally upright plates spaced with opposed faces,
   (b) hinged members,
   (c) said hinged members being rigidly secured to respective upper ends of said normally upright plates,
   (d) said hinged members pivotally connecting said normally upright plates,
   (e) a spring member,
   (f) said spring member being mounted on said hinged members to force said normally upright plates with opposed faces toward each other,
   (g) one of said pair of normally upright plates having a sufficient depth to bear against the outward portion of a gunwale of a boat and against a lower portion of the outward side of a boat spaced below the mentioned gunwale,
   (h) a stiff member,
   (i) said stiff member being secured to the opposed face of the opposite plate of said pair of normally upright plates,
   (j) said stiff member being projected from the opposed face of the mentioned opposite plate to contact an intermediate depth of the opposed face of the first mentioned normally upright plate, (k) said pair of normally upright plates adapted to be manually spread over a gunwale of a boat and released with the stiff member bearing on the inward side wall of the boat to clamp and stabilize the opposed face of the outward upright plate against movement on the outward face of the gunwale and mentioned portion of the side wall of the boat by relatively moving objects,
(l) a hook,
(m) said hook being secured to the mentioned opposite upright plate on the opposite face thereof from said stiff member and adapted to support a portion of a fishing rod.

References Cited by the Examiner
UNITED STATES PATENTS

| | | | |
|---|---|---|---|
| 2,564,625 | 8/51 | Jackson et al. | 43—21.2 |
| 2,580,625 | 1/52 | Waltz | 211—60 |
| 2,631,804 | 3/53 | Uhlhorn | 248—216 |
| 2,705,603 | 4/55 | Bitz et al. | 248—43 |

CLAUDE A. LE ROY, *Primary Examiner.*